(12) United States Patent
Iwatsuki et al.

(10) Patent No.: US 6,227,610 B1
(45) Date of Patent: May 8, 2001

(54) CROSS MEMBER OF AN AUTOMOBILE BODY

(75) Inventors: Shuuichiro Iwatsuki; Takeshi Aoki, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/252,091

(22) Filed: Feb. 18, 1999

(30) Foreign Application Priority Data

Feb. 19, 1998 (JP) .................................................. 10-037217
Nov. 17, 1998 (JP) .................................................. 10-327022

(51) Int. Cl.7 .................................................. B60R 27/00
(52) U.S. Cl. .......................................... 296/204; 296/205
(58) Field of Search ............................... 276/203.01, 204, 276/205, 203.04; 296/185

(56) References Cited

U.S. PATENT DOCUMENTS 4,826,238 * 5/1989 Misono et al. ....................... 296/205
5,018,780 * 5/1991 Yoshii et al. ..................... 296/203.04
5,127,704 * 7/1992 Komatsu ............................... 296/204
5,806,919 * 9/1998 Davies ................................. 296/205

* cited by examiner

Primary Examiner—D. Glenn Dayoan
Assistant Examiner—Jason Morrow
(74) Attorney, Agent, or Firm—Arent Fox Kintner Plotkin & Kahn, PLLC (57) ABSTRACT

A cross member for use in an automobile body is formed of an extruded material and has a first portion and a second portion. The first portion is formed by vertically stacking two closed sectional portions. The second portion extends downward from one of the front and rear walls of the first portion in the form of an apron. The second portion is provided with a cutout portion matching the contour of the floor tunnel. A bottom wall of the first portion is joined to the top of the floor tunnel, and the edge faces of one closed sectional portion of the first portion are joined to the inner sides of the respective side sills.

8 Claims, 9 Drawing Sheets

CROSS MEMBER OF AN AUTOMOBILE BODY

BACKGROUND OF THE INVENTION

1. Field of the Invention

This invention relates to a cross member being extended in the width direction of an automobile body and provided in the intermediate portion of an automobile body floor in the longitudinal direction thereof. The cross member crosses a floor tunnel in the automobile body floor.

The present application is based on Japanese Patent Applications No. Hei. 10-37217 and No. Hei. 10-327022, which are incorporated herein by reference.

2. Description of the Related Art

There is a recent tendency to take the deformation of the passenger room not only by the head-on collision load but also by the side impact load seriously.

On the other hand, the time is ripe for putting to practical use an automobile body structure made of aluminum-alloy in order to meet a demand for decreasing automobile body weight.

However, it is not easy to apply spot welding to the aluminum alloy, so if the conventional method of welding the steel sheets is used for welding of aluminum alloy, it is unavoidable that the production cost rises sharply.

Further, at the central portion of an automobile body floor in the width direction thereof, there is provided a so-called floor tunnel having a recessed surface opening downward and being continuous in the longitudinal direction of the automobile floor, in which a propeller shaft and an exhaust pipe are provided. And a cross member crossing the floor tunnel is extendedly provided in the lateral direction of the floor. Since the floor tunnel is opened downward, the closed section of the cross member crossing the floor tunnel has to be divided into parts in the intersecting portion.

In view of securing bending strength as much as possible, it is not preferable to divide into parts the cross member which is to play an important part as a reinforcing member against side impact because dividing the cross member into parts causes the strength to decrease.

In order to secure the rigidity of the intersecting portion where the cross member and the floor tunnel intersect, a reinforcing member may be added to the cross member. However, the addition of such a reinforcing member thereto incurs the complication of the process of producing the intersecting portion, which leads to an increase in production cost.

SUMMARY OF THE INVENTION

To solve the above problems, it is an object of the present invention to provide a cross member made of aluminum alloy for an automobile body floor and structured so as to be rigid enough to restrain the deformation of a passenger room at the time of side impact without incurring a steep rise in production cost.

Further, it is another object of the present invention to provide an improved frame member for use in forming a cross member in that the lowering of its strength is simply minimized.

In order to accomplish the object above, a cross member of an automobile body floor according to the present invention is extendedly provided in the direction of crossing a floor tunnel. Both ends of the cross member are respectively joined to left and right side sills in the intermediate portion of the automobile body floor in the longitudinal direction thereof. The cross member is formed of an extruded material and has a first portion having a closed section and a second portion in the form of an apron extended downward from one of the front and rear walls of the first portion. The second portion is provided with a cutout portion matching the contour of the floor tunnel and the bottom wall of the first portion is joined to the top of the floor tunnel. The edge faces of the closed sectional portion of the first portion are joined to the inner sides of the respective side sills. With this arrangement, the closed sectional portion is pervaded over the whole length in the width direction of an automobile, whereby the bending rigidity of the cross member extendedly provided across the floor tunnel can be increased without causing the complication of the manufacturing process. In particular, slide guide means (T-slots according to the embodiment of the invention) are provided in the surface of the bottom wall of the first portion and by slidably joining a fastener member (a T-nut according to the embodiment of the invention) for mounting an auxiliary mechanical member to the slide guide means, such an auxiliary mechanical member (a bracket for supporting a Bowden cable for a hand brake or a fuel tank fastening band according to the embodiment of the invention) can be fitted in any given position of the cross member.

Further, in order to accomplish the object above according to the present invention, a frame member for use in forming a cross member crossing a floor tunnel in an automobile body is provided. A continuous closed sectional portion is formed by extruding a light metal material so that the closed sectional portion is positioned in the uppermost row. With this arrangement, the continuous closed section can be formed easily by extrusion forming.

Features and advantages of the invention will be evident from the following detailed description of the preferred embodiments described in conjunction with the attached drawings.

DETAILED DESCRIPTION OF THE PREFERRED EMBODIMENTS

A detailed description will be given of embodiments of the present invention with reference to the accompanying drawings in detail.

Figure 1:
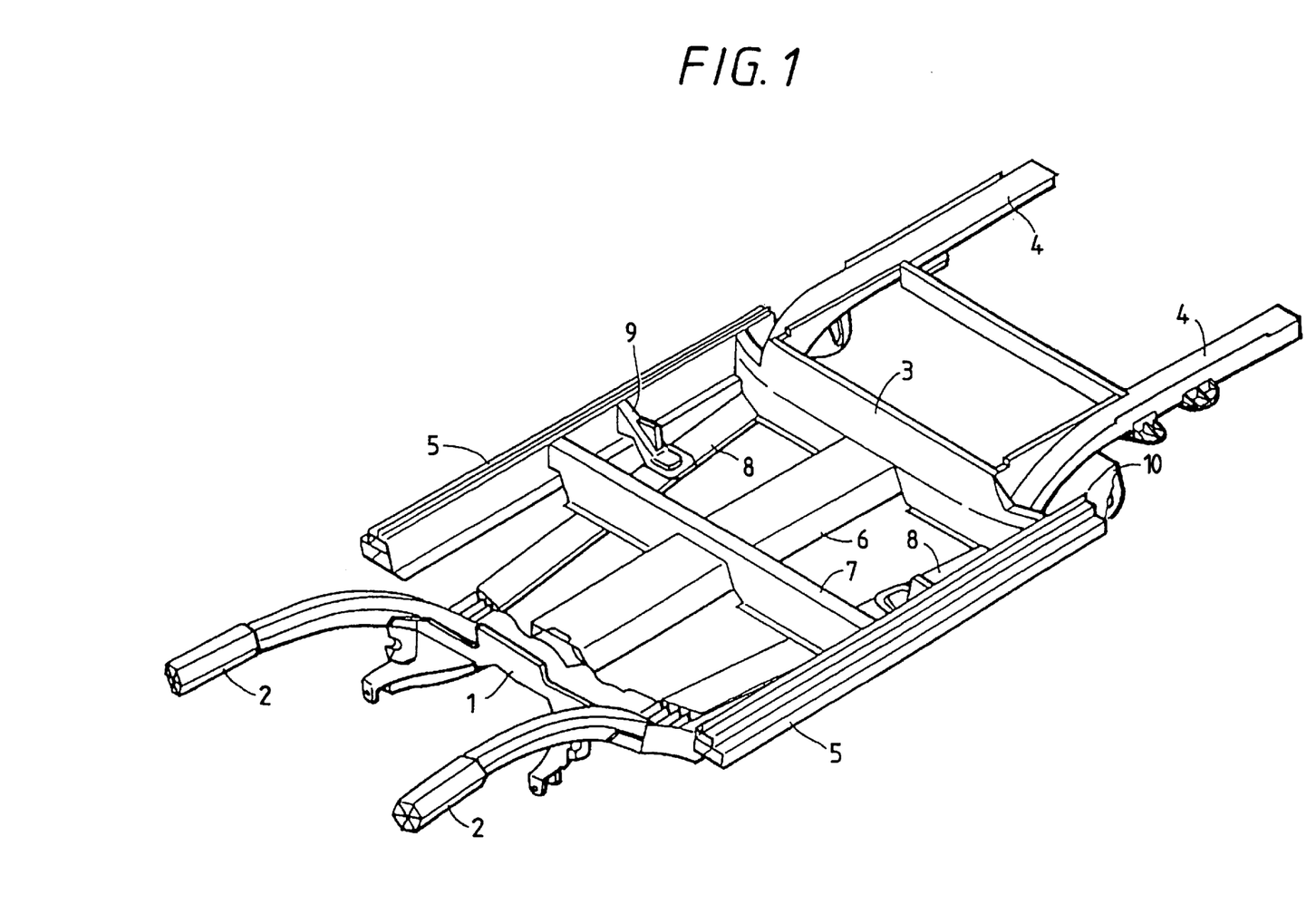
FIG. 1 shows a perspective view of an automobile body frame according to a first embodiment of the present invention.

FIGS. 1 to 7 show a first embodiment of the present invention. FIG. 1 is a diagram illustrating an overall lower automobile body frame according to the first embodiment of the present invention. The frame is formed by welding together various members made of aluminum alloy, and comprises lateral pair of front side frames 2, a lateral pair of rear side frames 4, a lateral pair of side sills 5, a floor tunnel 6, a middle cross member 7, a pair of floor beams 8, sheet rail brackets 9, and an outrigger 10.

The lateral pair of front side frames 2 extend forward, and rear ends thereof are joined to a dash board lower cross member 1. The lateral pair of rear side frames 4 extend backward, and front ends thereof are joined to a rear cross member 3. The lateral pair of side sills 5 are extendedly provided in the longitudinal direction so as to couple the respective side ends of the dash board lower cross member 1 and the rear cross members 3. The floor tunnel 6 is extendedly provided in the longitudinal direction between and parallel relative to the lateral pair of slide sills so as to couple the central portions of the dash board lower cross member 1 and the rear cross members 3. The middle cross member 7 couples the lateral side sills 5 in the longitudinal intermediate portion of a passenger room. Each of the pair of floor beams 8 couples the joint of the front side frame 2 to the dash board lower cross member I with the side end of the rear cross member 3. The pair of floor beams 8 are disposed so that the distance between two floor beams 8 gradually expands toward the rear side. The sheet rail brackets 9 are provided in the rear of the middle cross member 7 so as to couple the side sills 5 to the respective hollow beams 8. The sheet rail brackets 9 supports the rear ends of sheet rails (not shown). The outrigger 10 is provided in each coupling portion among the rear cross member 3, the rear side frame 4, the side sill 5 and the floor beam 8 to support a rear suspension arm.

Each of these members is formed of a hollow material prepared by extrusion molding except that the dash board lower cross member 1, the sheet rail brackets 9 and the outriggers 10 are formed by die casting.

Figure 10:
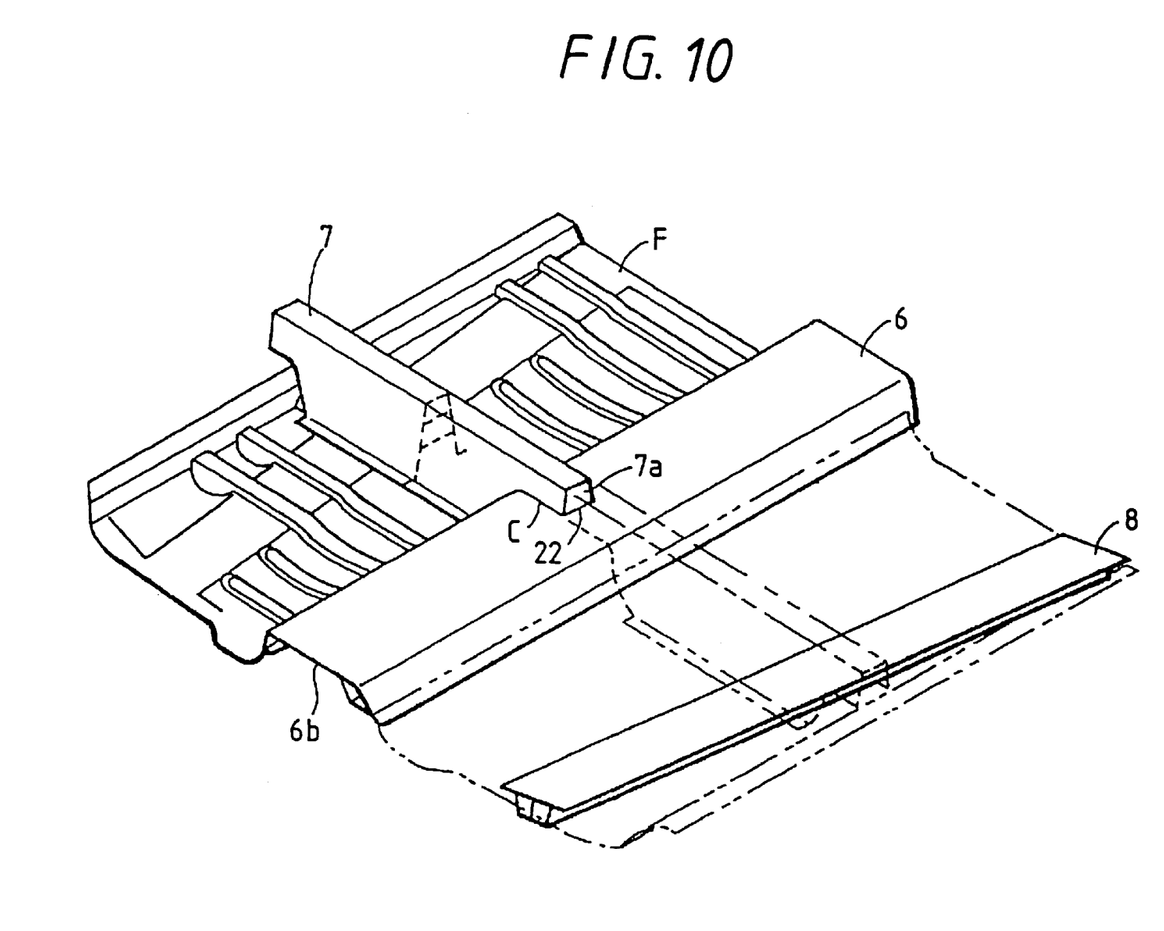
FIG. 10 shows a perspective view of a connecting portion where a floor tunnel and the middle cross member are connected in FIG. 8.

Although illustration has been omitted in FIG. 1, flooring F which is formed by press-molding an aluminum alloy sheet is put in a passenger room and a trunk room (see FIG. 10).

Figure 2:
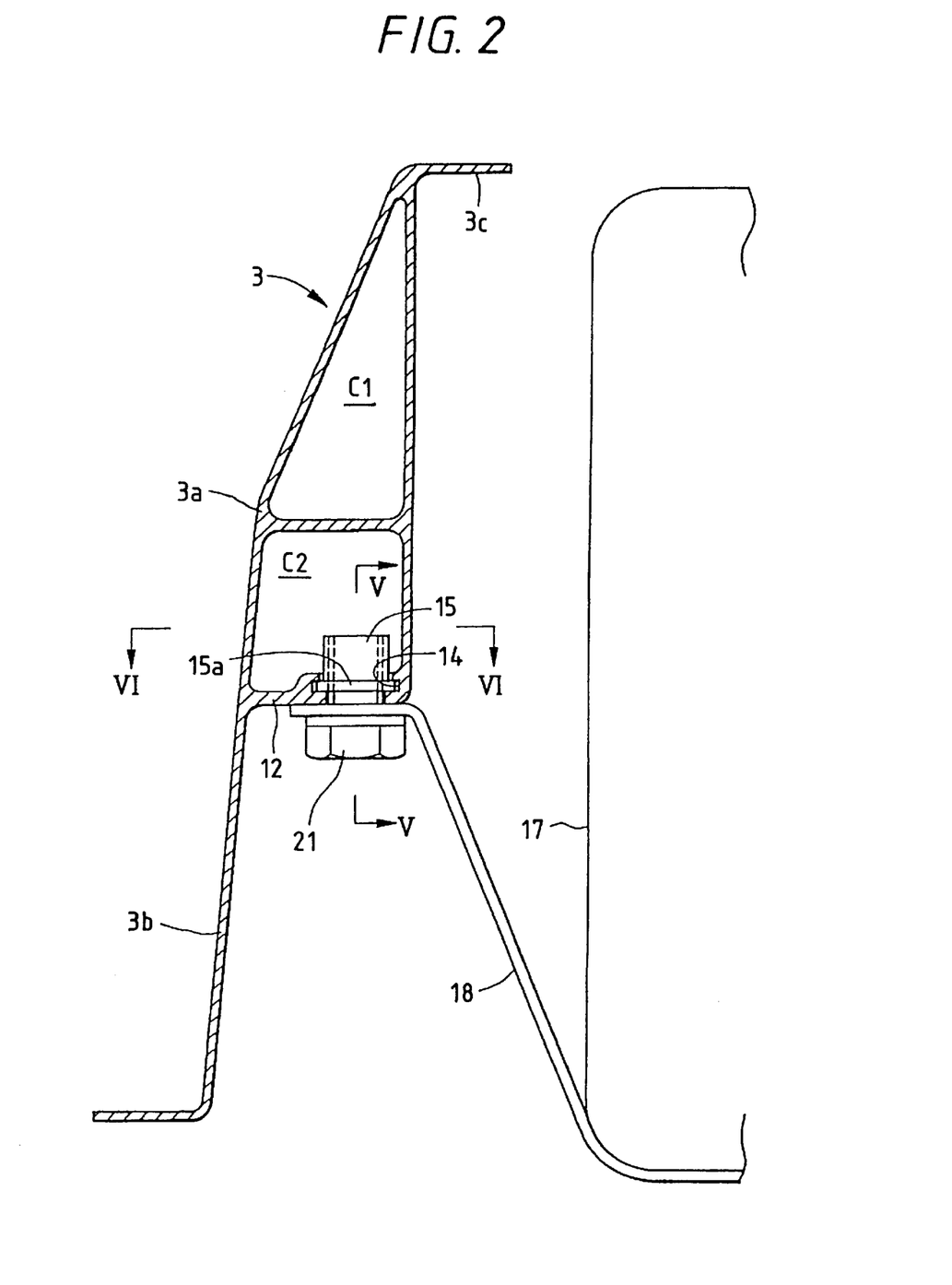
FIG. 2 shows a vertical sectional view of a rear cross member.

The rear cross member 3 connected to the rear end of the floor tunnel 6 is formed by extrusion molding from aluminum alloy. As shown in FIG. 2, the cross sectional shape of the rear cross member 3 includes a first portion 3a, a second portion 3b, and an eaves-like portion 3c. The first portion 3a is formed by vertically stacking two closed sectional portions C1, C2. The second portion 3b extends downward from the front wall of the first portion 3a with its lower edge portion extended forward like an apron. The eaves-like portion 3c extends backward from the top of the first portion 3a.

Figure 3:
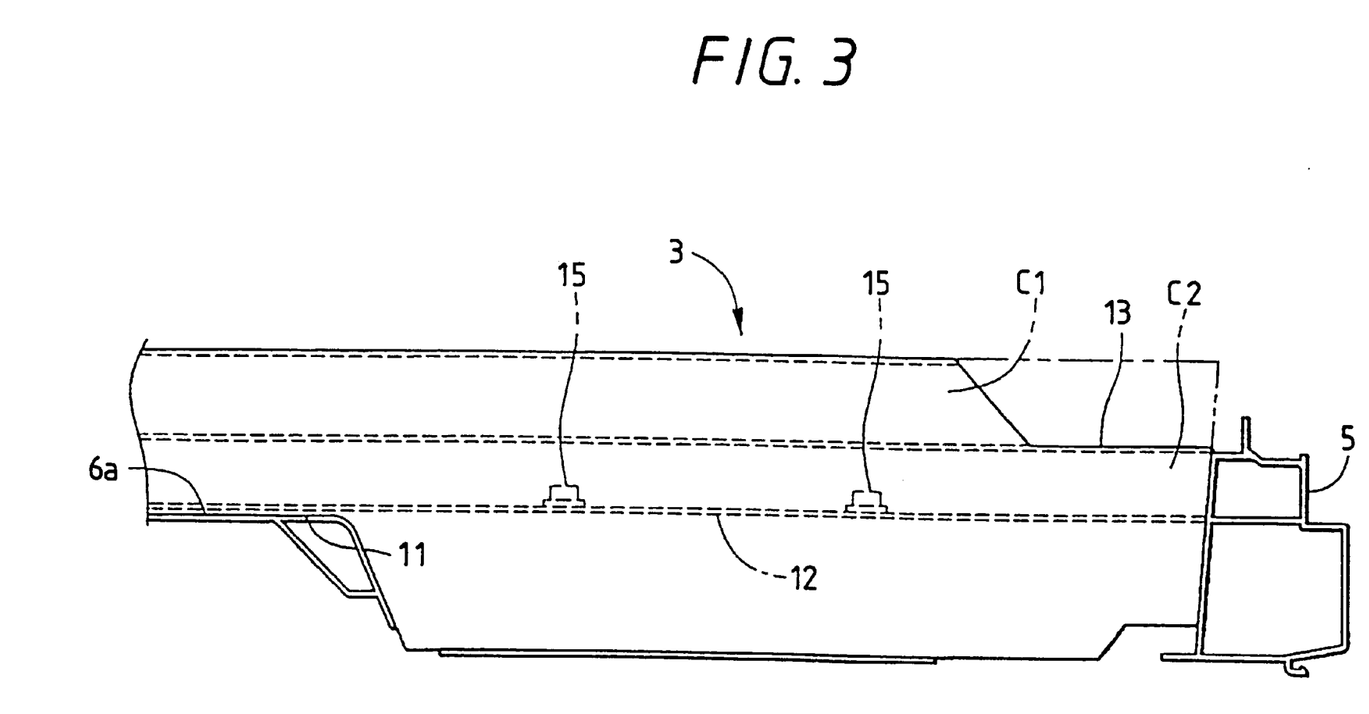
FIG. 3 shows a partial perspective view of the joint between a floor tunnel and the rear cross member.
Figure 4:
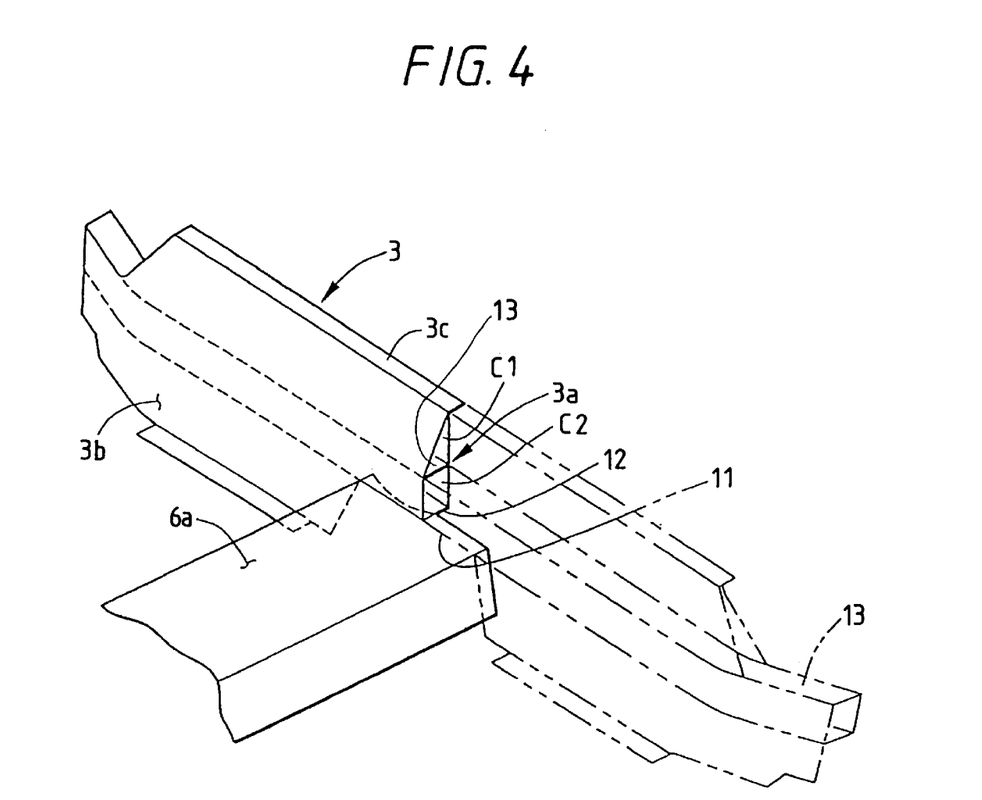
FIG. 4 shows a perspective view of the adjacent region of the rear cross member.

As shown in FIGS. 3 and 4, a cutout portion 11 matching the contour of the floor tunnel 6 is formed in the center of the second portion 3b of the rear cross member 3. The undersurface of a bottom wall 12 of the first portion 3a is brought into contact with a top 6a in the rear end portion of the floor tunnel 6 which forms a crest having a flat top 6a in cross section. Further, the central portion of the rear cross member 3 is joined to the rear end portion of the floor tunnel 6 by fillet-welding the aforesaid contact portions.

Both the side end portions of the rear cross member 3 are curved backward, and a portion above the intermediate partition wall 13 between the two closed sectional portions C1, C2 of the first portion 3a is cut off. Further, terminals of the lower closed sectional portion C2 and the second portion 3b are welded by fillet welding onto the inner side of the side sill 5. So the lateral side sills 5 are coupled together via the rear cross member 3 whose hollow closed sectional portion C2 is continuous over the whole length in the width direction of an automobile.

T-slots 14 are formed in the surface of the bottom wall 12 of the first portion 3a of the rear cross member 3 as shown in FIG. 2. So a rectangular expanded portion 15a a formed in the end portion of a T-nut 15 can mate therewith as shown in both FIGS. 5 and 6. A U-shaped cut-raised portion 16 which is able to mate with each of the left and right ends of the expanded portion 15a is formed in any desired position of the bottom wall 12 whereby to position the T-nut 15 properly. Since the T-nut 15 mates with the T-slots 14 by means of the rectangular expanded portion 15a, idle turning is avoided when a bolt 21 for use in fastening an auxiliary mechanical member such as a band 18 (see FIG. 2) for fixing, for example, a fuel tank 17 or a bracket 20 (see FIG. 7) for supporting a Bowden cable 19 for a hand brake is driven into a female screw hole tightly.

Figure 5:
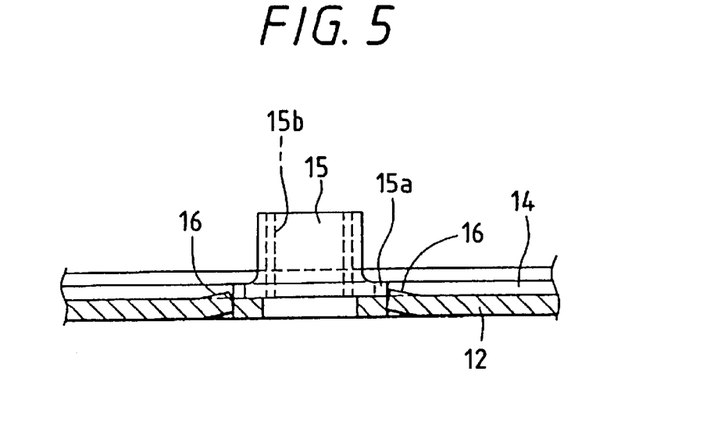
FIG. 5 shows a sectional view of the principal part taken along line V—V in FIG. 2.
Figure 6:
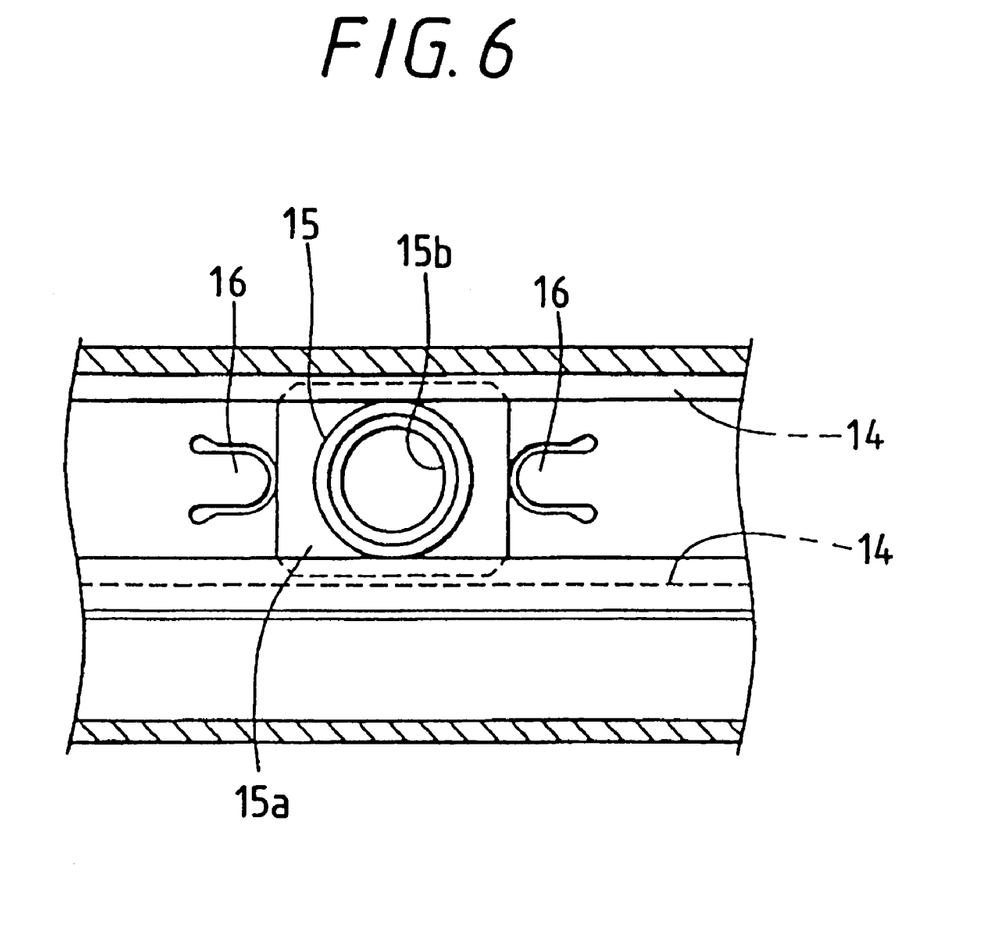
FIG. 6 shows a sectional view of the principal part taken along line VI—VI in FIG. 2.
Figure 7:
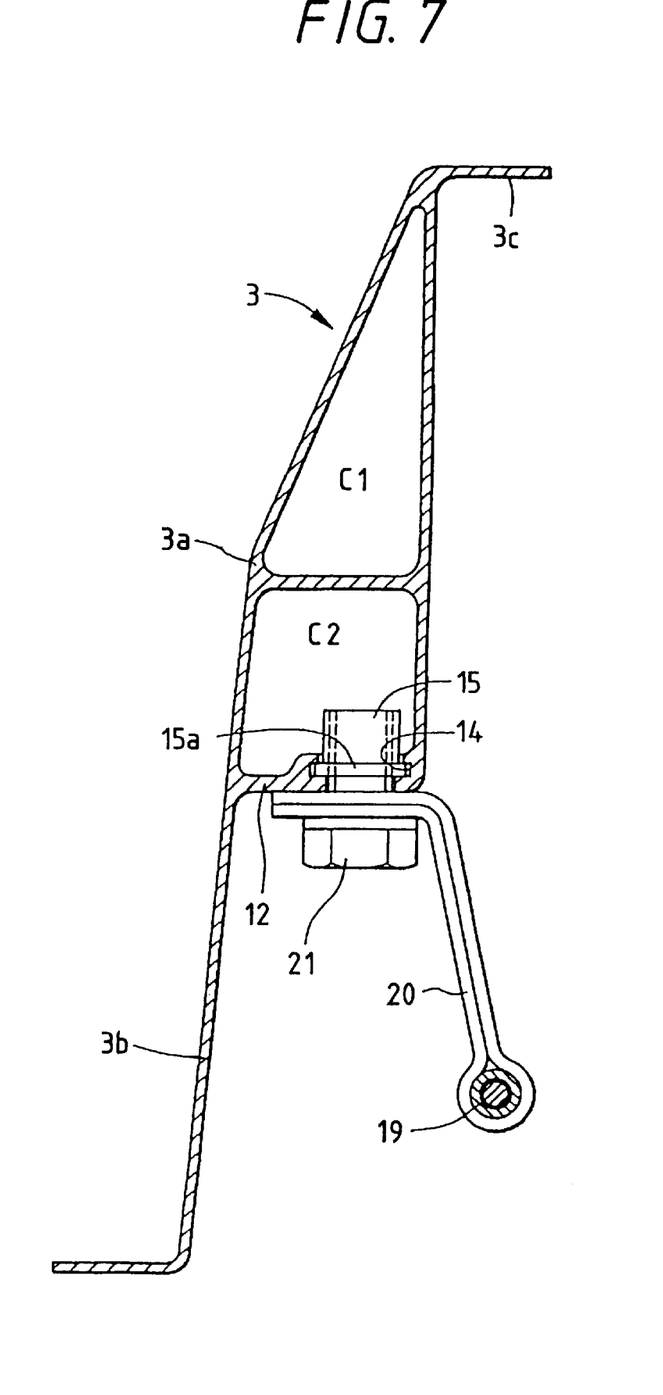
FIG. 7 shows a vertical sectional view of another example of a cross member.

In this case, the T-nut 15 may be provided as many as desired in given positions of the T-slots. According to this embodiment of the invention, there is shown a case including but not limited to providing the T-nut 15 laterally symmetrically in two places on the left- and right-hand sides and using two of them inside for brackets 20 for supporting a Bowden cable 19 for a hand brake and two of them outside for bands 18 for fixing a fuel tank 17.

According to the above embodiment, the effect of restraining the deformation of the passenger room due to side impact can effectively achievable without incurring an increase in production cost because a highly rigid cross member is comparatively simply obtainable. Moreover, the slide guide means such as the T-slots are provided in the surface of the bottom wall of the first portion. Since the fastener member is easily provided in the closed sectional portion by slidably joining the fastener member such as the T-nut to the slide guide means, an auxiliary mechanical member can be fitted in any given position of the cross member without incurring the lowering of the strength of the cross member.

Figure 8:
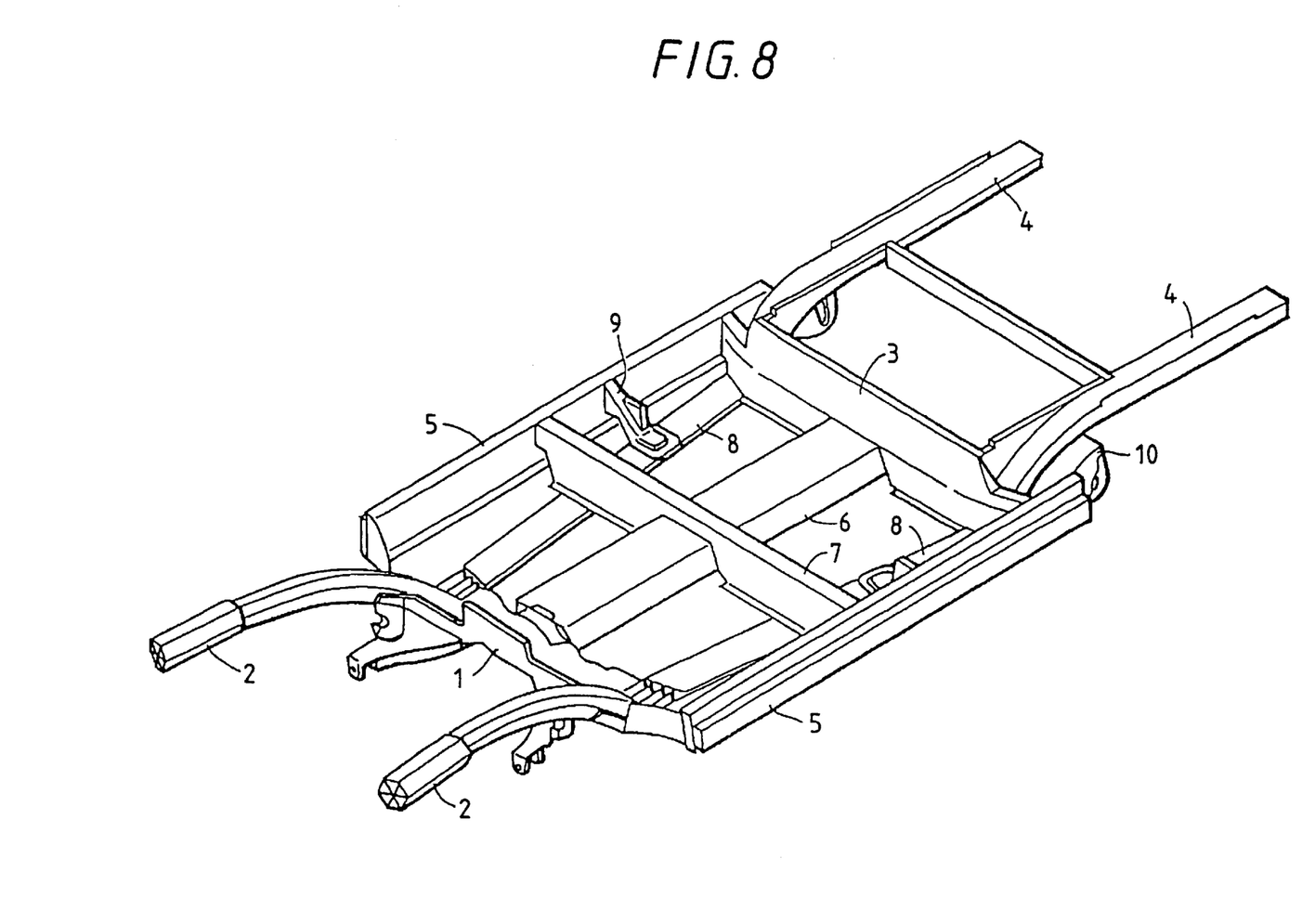
FIG. 8 shows a perspective view of an automobile body frame according to a second embodiment of the present invention.
Figure 9:
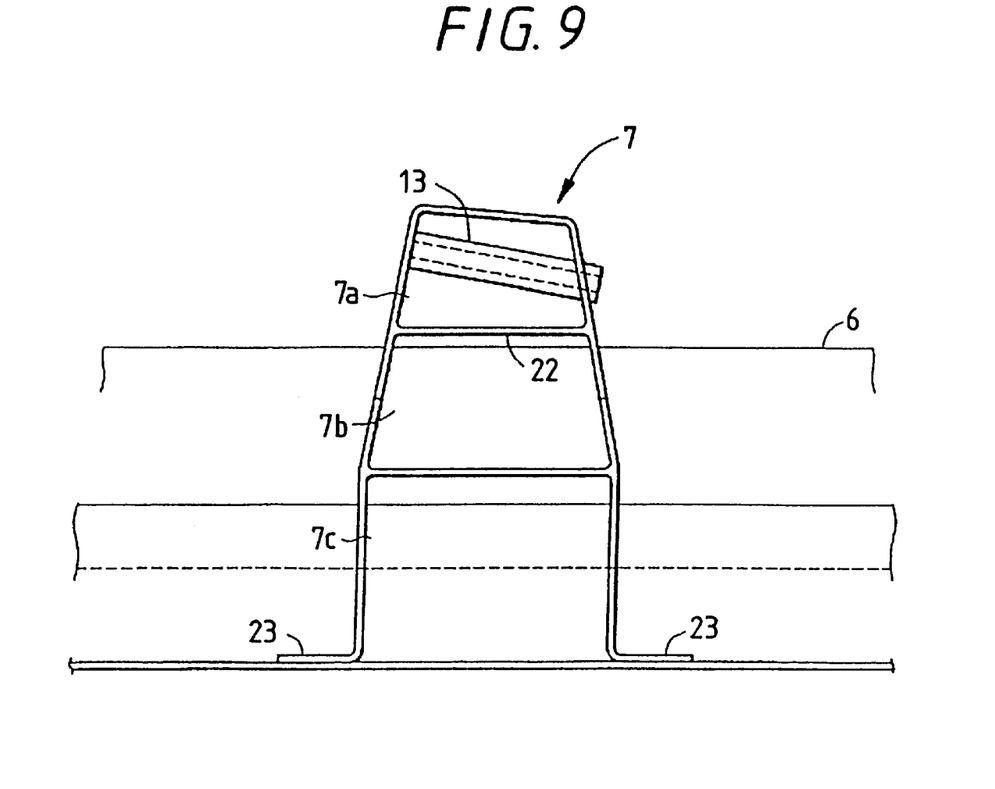
FIG. 9 shows a side view of a middle cross member in FIG. 8.

FIGS. 8 to 10 show a second embodiment of the present invention. The same parts are designated by the same numbers as in the first embodiment, and the explanation thereof will be omitted.

The middle cross member 7 crossing the intermediate portion of the floor tunnel in the longitudinal direction thereof is continuously formed by extruding aluminum alloy as shown in FIG. 9. The sectional shape includes a combination of vertical two-stage closed sectional portions 7a and 7b which are substantially trapezoidal in sectional contour, and a hat-like sectional portion 7c having flanges 23 extended outwardly on its respective edges.

As shown in FIG. 10, the floor tunnel 6 is continuously formed by extruding aluminum alloy so that the floor tunnel has a recessed surface 6b opened downward and a predetermined sectional shape with its top having a flat crest.

A cutout portion C matching the outer contour of the floor tunnel 6 is formed in the intersecting portion where the middle cross member 7 and the floor tunnel 6 intersect. However, the intermediate partition wall 22 between the vertical two-stage closed sectional portions 7a and 7b is left then so that while the closed sectional portion 7a at the uppermost stage is kept closed, it is made to remain hollow laterally.

Nut members 13 with female screw holes into which bolts are screwed are secured to proper places of the middle cross member 7 so as to make the middle cross member 7 function as a sheet rail mount.

Since the laterally continuous closed sections can be relatively easily provided to the cross member according to the present invention, the passenger room of the automobile body is supplied with necessary and sufficient bending rigidity without increasing the overall production cost. Therefore, the effect of not only improving the NVH (noise vibration harshness) properties of the automobile body but also restraining the deformation of the passenger room due to the collision load is achievable to a greater extent.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A cross member of an automobile body, said cross member being formed of extruded material and extending so as to cross a floor tunnel, both ends thereof being respectively joined to left and right side sills, said cross member comprising:

a first portion having a closed section;

a second portion being extended downward from one of a front side and a rear side of said first portion; and a cutout portion formed in said second portion and matching a contour of the floor tunnel, an undersurface of a bottom wall in the cross section of said first portion being joined to an upper surface of the floor tunnel, wherein edge faces of the closed section of said first portion are joined to inner sides of the respective side sills.

2. A cross member of an automobile body according to claim 1, wherein said first portion comprises an upper closed sectional portion and a lower closed sectional portion vertically stacked with each other, side end portions of said upper closed portion are cut off, and the edge faces of said lower closed portion and said second portion are joined to inner sides of the respective side sills.

3. A cross member of an automobile body according to claim 1, further comprising slide guide means being provided on an upper surface of the bottom wall of said first portion, and a fastener member being slidably fitted to said slide guide means for fitting an auxiliary mechanical member.

4. A cross member of an automobile body according to claim 3, wherein said slide guide means is T-slots formed on the upper surface of the bottom wall of said first portion, and said fastener member is a T-nut having a expanded portion to mate with said T-slots.

5. A cross member of an automobile body according to claim 4, further comprising a cut-raised portion formed on the upper surface of the bottom wall to mate with the expanded portion of said T-nut.

6. A frame member for use in a cross member crossing a floor tunnel in an automobile body, comprising vertically stacked and continuously closed sectional portions formed by extruding a light metal material and having a first closed sectional portion that is positioned in an uppermost row in the vertically stacked closed sectional portions.

7. The frame member for use in forming a cross member according to claim 6, wherein the vertically stacked closed sectional portions are joined to the floor tunnel so as to be continuously and extendedly provided in a lateral direction above an upper surface of the floor tunnel.

8. The frame member for use in forming a cross member according to claim 6, wherein the vertically stacked closed sectional portions further comprise a second closed sectional portion beneath the first closed sectional portion, and an apron portion being extended from a lower end of the second closed portion.

* * * * *